United States Patent [19]

Baughman

[11] Patent Number: 5,011,216
[45] Date of Patent: Apr. 30, 1991

[54] EXPANDABLE SLEEPING COMPARTMENT FOR VEHICLES

[76] Inventor: Milo Baughman, 24 South 600 East, Salt Lake City, Utah 84102

[21] Appl. No.: 366,553

[22] Filed: Jun. 15, 1989

[51] Int. Cl.⁵ .................................... B60P 3/39
[52] U.S. Cl. .................................. 296/164; 296/26; 296/161; 296/165; 296/174; 296/175; 296/176; 135/88
[58] Field of Search .............. 296/161, 164, 165, 171, 296/172, 174, 175, 176, 26; 135/88, 905

[56] References Cited

U.S. PATENT DOCUMENTS

| | | | |
|---|---|---|---|
| 1,276,388 | 8/1918 | Marx | 296/161 |
| 3,271,065 | 9/1966 | Scuris | 296/26 X |
| 3,381,421 | 5/1968 | Sicklesteel | 296/26 X |
| 3,410,598 | 11/1968 | Davis et al. | 296/26 X |
| 3,466,082 | 9/1969 | Branch | 135/88 X |
| 3,515,426 | 6/1970 | Gerber | 135/88 X |
| 3,887,226 | 6/1975 | Hart | 296/23 |
| 4,027,911 | 6/1977 | Johnson | 296/161 |
| 4,057,285 | 11/1977 | Bemos | 296/23 |
| 4,065,166 | 12/1977 | Shoemaker | 296/26 X |
| 4,112,958 | 9/1978 | Anderberg | 135/88 |
| 4,192,544 | 3/1980 | Patterson | 296/165 |
| 4,295,678 | 10/1981 | Morris | 296/196 |
| 4,462,631 | 7/1984 | Lange | 296/160 |
| 4,462,631 | 8/1984 | Lange | 296/161 X |
| 4,513,461 | 4/1985 | Tardivel | 5/413 |
| 4,548,438 | 10/1985 | Myers | 296/164 X |
| 4,653,800 | 3/1987 | Myers | 296/164 X |
| 4,930,837 | 6/1990 | Marsh et al. | 296/165 |

FOREIGN PATENT DOCUMENTS

| | | | |
|---|---|---|---|
| 1099311 | 4/1981 | Canada | 296/169 |
| 2836551 | 3/1980 | Fed. Rep. of Germany | 296/165 |
| 2840613 | 3/1980 | Fed. Rep. of Germany | 296/161 |
| 2617449 | 1/1989 | France | 296/172 |
| 432367 | 7/1935 | United Kingdom | 296/161 |
| 2001589 | 2/1979 | United Kingdom | 296/26 |
| 2148345 | 5/1985 | United Kingdom | 296/161 |

OTHER PUBLICATIONS

Reck, Franklin M. et al.; *Ford Treasury of Station Wagon Living*; May 29, 1957; Publ. Simon and Schuster, Inc.; pp. 6-11 and 58-61.

Primary Examiner—Margaret A. Focarino
Assistant Examiner—Andrew C. Pike
Attorney, Agent, or Firm—Lynn G. Foster

[57] ABSTRACT

An expandable vehicle sleeping compartment is mounted to an exterior side wall of a vehicle at an opening in the vehicle, extending and retracting horizontally therefrom when expanded. An inflatable air mattress and sleeping bag are disposed within the compartment upon expandable support structure and within a canopy. Access to the expanded compartment is through the interior of the vehicle.

32 Claims, 10 Drawing Sheets

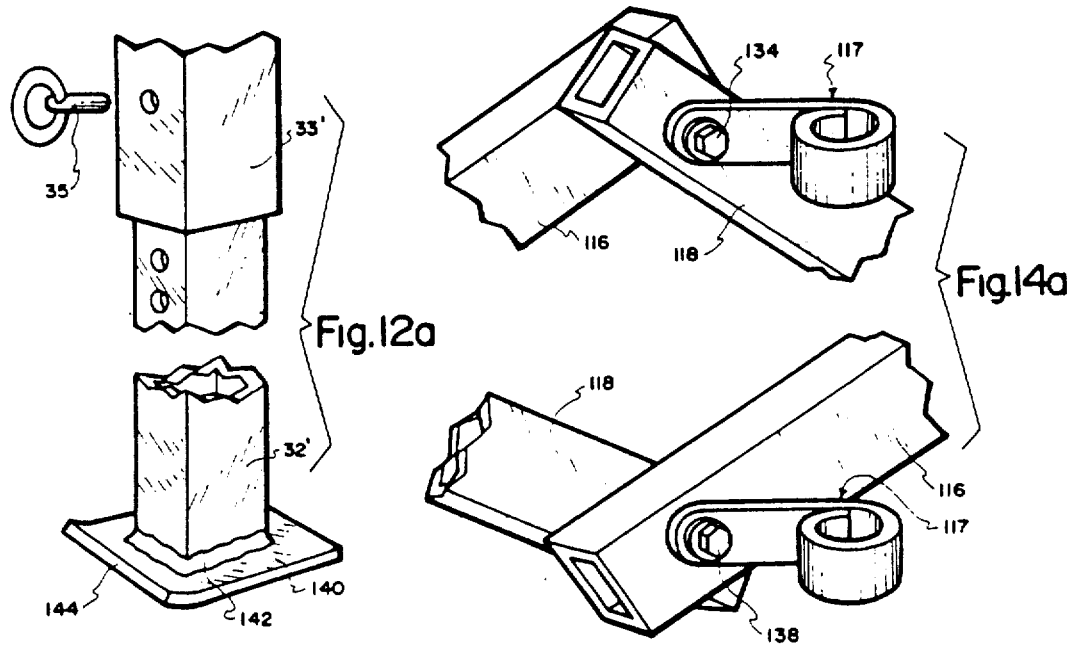
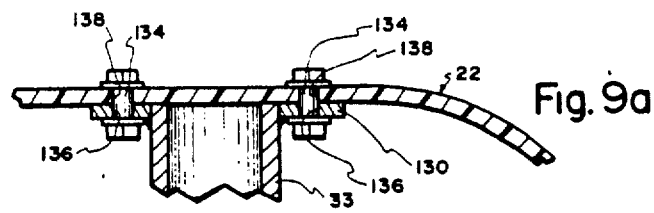
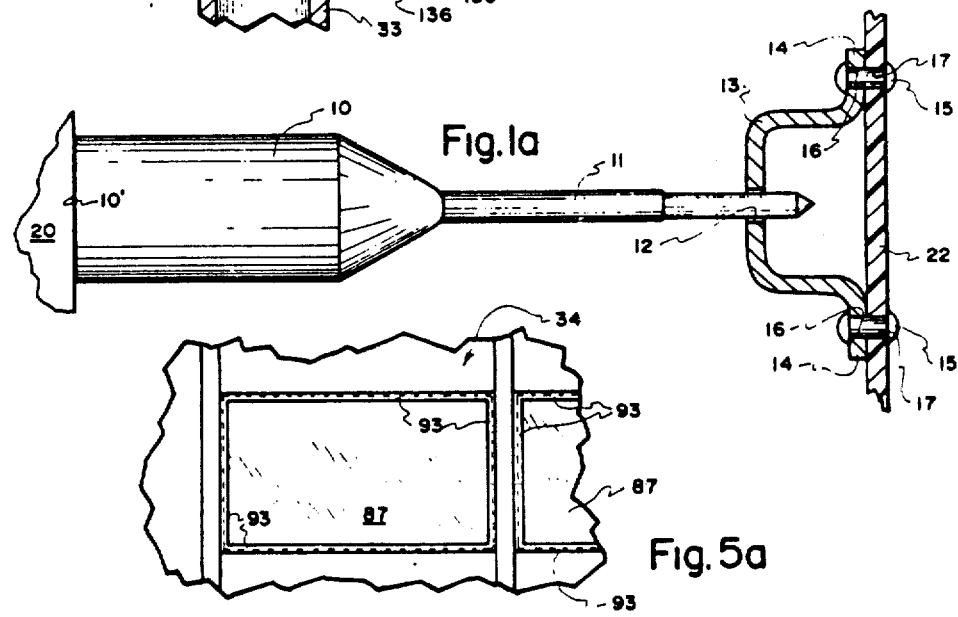

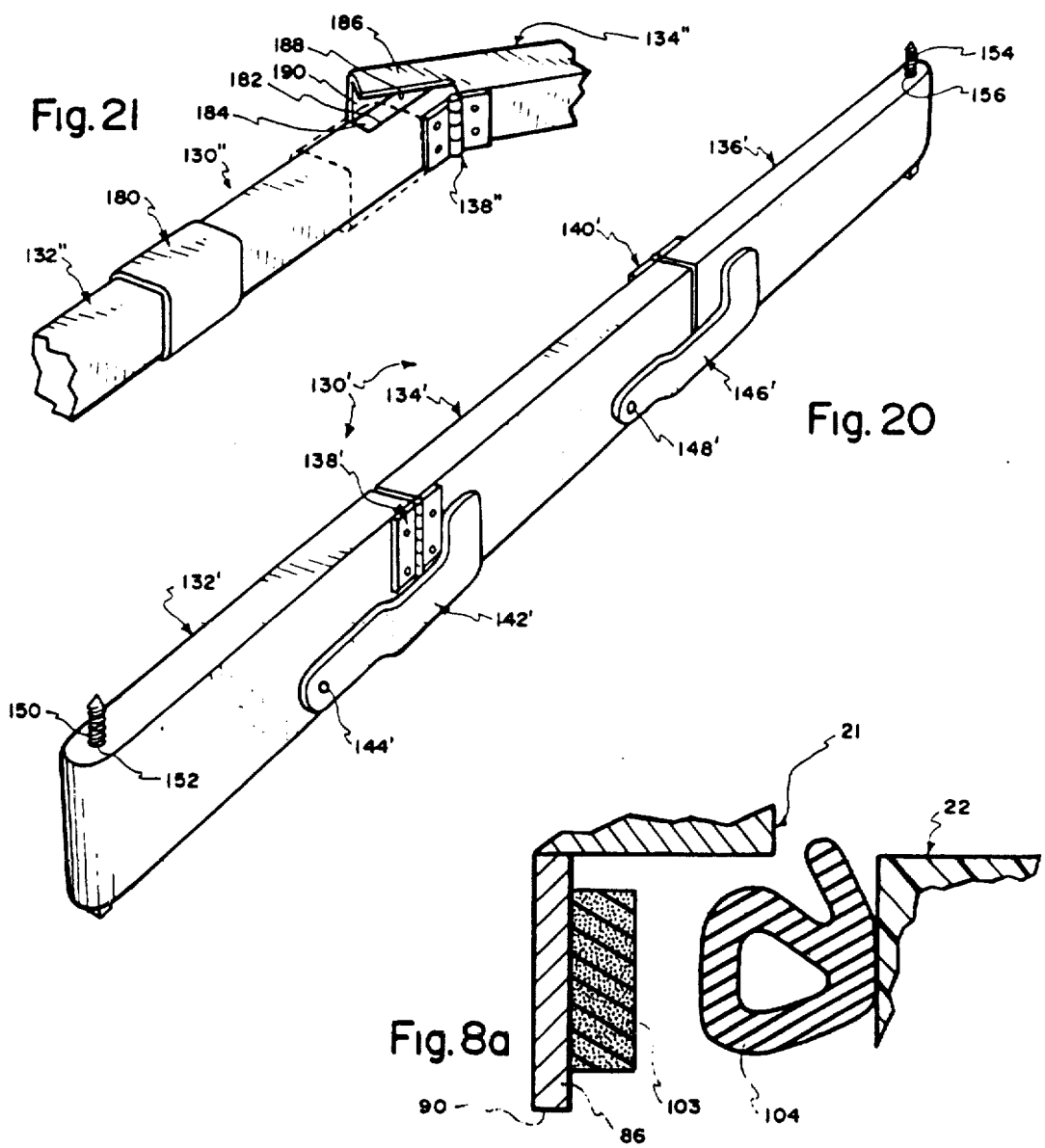

EXPANDABLE SLEEPING COMPARTMENT FOR VEHICLES

FIELD OF INVENTION

The present invention relates generally to a sleeping compartment and more specifically to a wall or window segment of a vehicle which is selectively outwardly expandable into a sleeping compartment.

PRIOR ART

Numerous previous proposals have been patented in which existing space in a recreational vehicle may be selectively increased or altered when that vehicle is at rest. For example, Applicant is aware of the following U.S. Pat. Nos.:

| | |
|---|---|
| 3,887,226 | 4,192,544 |
| 4,057,285 | 4,462,631 |

While these proposals address certain problems, particularly those related to lack of sleeping space, they also create or fail to solve many other problems.

Some prior art proposals comprise telescoping devices to extend existing space in recreational vehicles, such as vans or trailers. However, when compacted, these devices significantly alter the available interior space of the vehicle in such a way as to negatively effect its function, economy and comfort.

Another problem associated with the prior art is the time requirement, difficulty, and complexity in assembling and disassembling the extension device. This becomes an important consideration when the operator attempts to operate the device under extreme conditions, such as rain, snow, wind and darkness or where the operator is not technically well trained or poorly advised.

One substantial problem not addressed by the prior art is a lack of adaptability. Most prior art space extension or space altering devices fail to adapt in one or both of two ways. First, a few previous devices cannot be installed as an addendum to an existing vehicle. Rather, such devices must be integrated into the initial construction of the recreational vehicle. Second, most of the prior art devices which can be added to an existing vehicle have no breadth of versatility so the device can be added only to a single vehicle and cannot be added to a wide range of vehicles.

Prior proposals frequently rely on a cantilever support, which either is unstable or unduly limits the size of the sleeping compartment.

BRIEF SUMMARY AND OBJECTS OF THE INVENTION

In brief summary, the present invention overcomes or substantially alleviates the aforesaid problems of the prior art by providing a wall or window segment of a vehicle which is selectively expandable into a sleeping compartment. The wall or window segment/sleep unit may be used with any of a number of recreational vehicles, including mini and full-sized vans, pick-up trucks with shell tops, motor homes, trailers and station wagons. This invention comprises a generally loop-shaped substantially rigid shell or frame, an expandable/retractable sleeping support for a mattress or the like spanning between the shell or frame and the vehicle, an extensible collapsible canopy of flexible material above said support likewise spanning between the shell or frame and the vehicle and selectively usable ground engaging vertical support legs. The wall or window segment/sleeping compartment is typically installed at an appropriate opening in the vehicle. The wall or window segment/sleeping compartment is self-contained and does not infringe upon or materially alter available interior space within the vehicle either during use or during storage. The presently preferred unit is accessed through the interior of the vehicle.

In the collapsed position, the shell or frame is contiguous and generally aligned with the wall of the vehicle to which the unit is mounted. The mattress support, canopy and support legs are concealed in the collapsed position. The unit is moved into the as used extended position by pulling the shell linearly outward from the vehicle. The retractable mattress support extends to form the unit's floor, the flexible canopy is pulled taught, and the vertical legs are placed between the shell or frame and the ground in order to stabilize the unit's distal end.

With the foregoing in mind, it is a principal object of the present invention to provide a novel expandable sleeping compartment.

A further significant object is the provision of a wall or window segment/sleeping compartment which can be installed upon and used with a variety of vehicles.

Another important object of the invention is the provision of a collapsible extendible sleeping compartment which is easily installed as a modification to an existing vehicle and/or in a new vehicle during initial construction.

A further dominant object is the provision of an expandable self-contained sleeping unit which comprises a wall or window segment of a vehicle when collapsed, thus providing a convenient sleeping area without taking up any interior space of the vehicle at any time.

Yet another paramount object is to provide an expandable sleeping unit which is facilely extended into a stable as used position, as well as retracted into the as stored position.

Another important object of the present invention is the provision of an expandable vehicle sleeping compartment which has the following features and advantages: practical, easy to use, economical, aesthetically pleasing, inexpensive construction, aerodynamic design, safe, lightweight, time saving, structurally stable, space saving and does not materially alter interior space available for other purposes.

These and other objects and features of the present invention will be apparent from the detailed description taken with reference to the accompanying drawings.

BRIEF DESCRIPTION OF THE DRAWINGS

FIG. 1a is a front elevation of a solenoid/latch assembly taken along lines 1a-1a of FIG. 1 with parts removed for clarity;

FIG. 5a is an enlarged fragmentary side elevation illustrating a variation in the window configurations usable with a canopy of a sleeping compartment comprising the present invention;

FIG. 8a is an enlarged fragmentary cross section taken along lines 8a-8a of FIG. 8 of one seal arrangement which may be used between the vehicle adjacent the opening therein and the shell of the sleeping compartment with the shell partially displaced from the vehicle;

FIG. 9a is an enlarged fragmentary cross section of a circular leg-receiving tube secured to the top of the shell by use of a flange and nut and bolt assemblies;

FIG. 12a is an enlarged fragmentary perspective of square telescopically extensible leg comprising a solid skid-like pedestal or shoe;

FIG. 14a is an enlarged fragmentary perspective illustrating the use of metal sleeves to hold canopy braces in place;

FIG. 20 is an enlarged perspective of a foldable beam usable to centrally support the top of the canopy; and FIG. 21 is an enlarged fragmentary perspective of another foldable beam usable to centrally support the top of the canopy.

DETAILED DESCRIPTION OF THE ILLUSTRATED EMBODIMENT

Figures 1, 19:
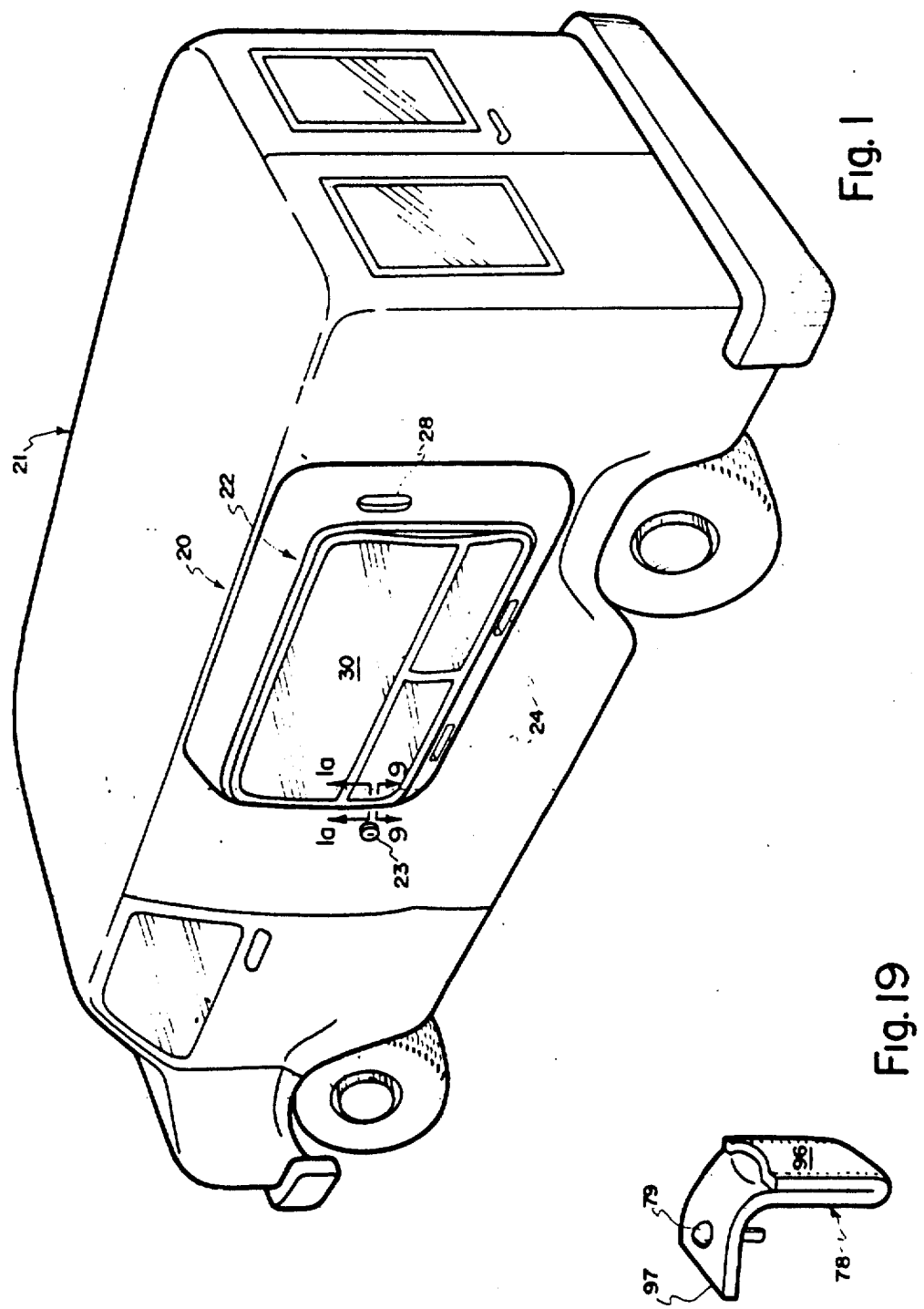
FIG. 1 is an exterior perspective view of a van equipped with one collapsible sleeping compartment, according to the present invention, shown in the closed or as stored position.
FIG. 19 is an enlarged perspective of a pocket structure for receipt of a canopy rib.

Reference is now made to the drawings, wherein like numerals are used to designate like parts throughout. More specifically, the present invention is directed towards a wall segment/sleeping compartment, generally designated 20, usable with any one of several conventional recreational vehicles, one of which is schematically shown in FIG. 1 and is generally designated 21. Attached to a side of van 21 is a generally loop-shaped, generally rectangular rigid shell or frame 22, preferably of fiberglass reinforced synthetic resinous material or the like. The shell 22 surrounds a window or like opening 90 (FIG. 8), has a perimeter slightly greater than opening 90, and is disposed primarily at the exterior of the opening 90. In the closed position of FIG. 1, the shell 22 essentially encapsulates all of the essential components of the wall segment/sleeping compartment 20.

The rigid shell 22, as best seen in FIG. 1, comprises handles 24, which comprise no moving parts and are simply grasped manually when the shell 22 has been released to displace the compartment to its extended horizontally-extending position. Conventional solenoid ejectors, connected to the electrical system of the vehicle, may be used as part of the present system and, when actuated, displace the shell 22 away from the vehicle 21. The van 21 is illustrated as comprising key receiving sites 23. Each key receiving site 23 is key actuated. With reference to FIG. 1A, actuation by a key of site 23 energizes and de-energizes a solenoid 10 extending and retracting a solenoid rod 11 into and out of an aperture 12 in a conventional U-shaped latch 13. Latch 13 comprises a flange 14 secured by rivets 15 in holes 16 and 17 to the shell 22 to extend and retract a bolt into and from a standard female receptacle carried by the shell 22. Since this type of lock is conventional, no further description is needed.

Shell 22 also comprises holes 26 (FIG. 11), situated in the lower segment thereof, through which vertical telescoping support legs 32 reciprocate between extended and retracted positions each within a leg-receiving tube 33. The shell 22 may further comprise one or more standard safety lights 28 and a conventional window assembly 30. Shell 22, in the illustrated configuration, is manufactured such that preferably an existing vehicle side window assembly is removed from the vehicle and used to comprise assembly 30, being specially conventionally fitted to shell 22.

Figure 2:
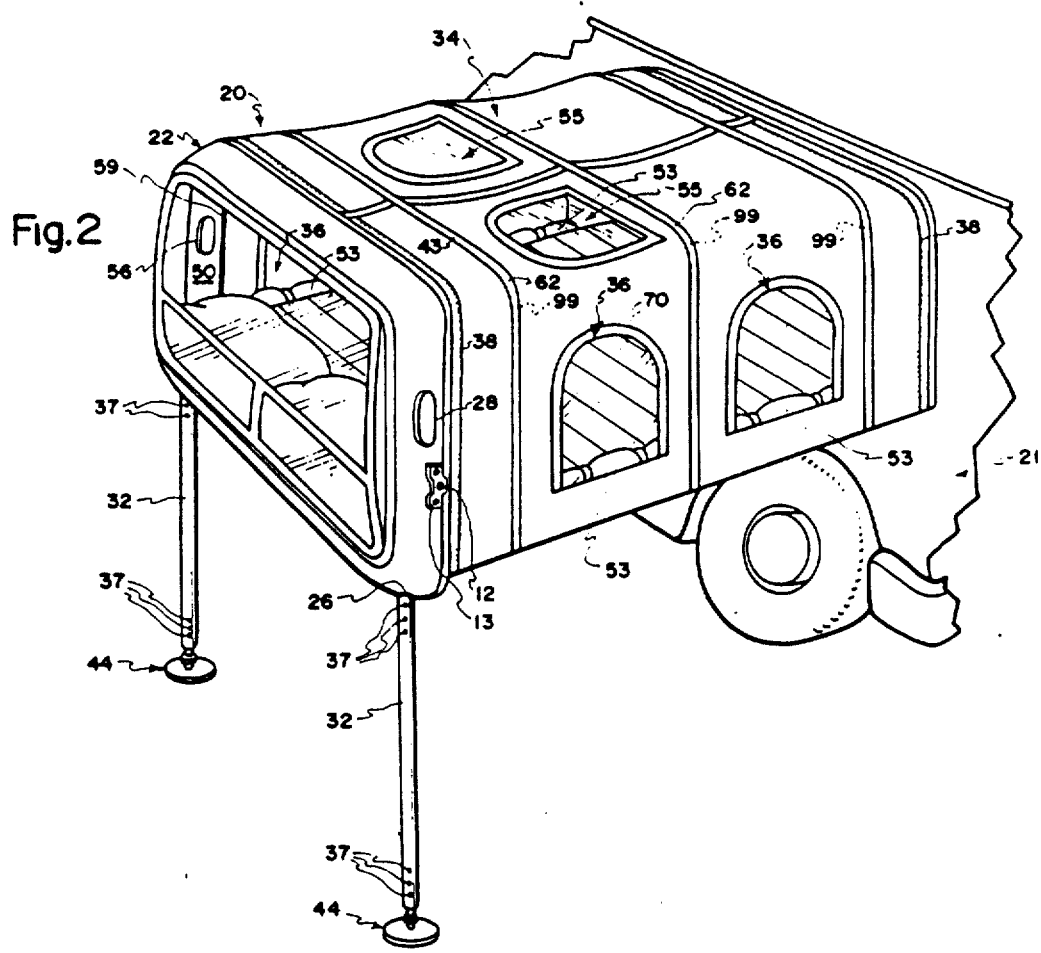
FIG. 2 is an exterior perspective view similar to FIG. 1 showing the sleeping compartment in its fully extended as used position.

FIG. 2 shows a perspective view of the wall segment/sleeping compartment 20 fully extended. The two vertical telescoping support legs 32 are shown fully extended from holes 26 in the as used ground engaging position. As shown, each leg 32 is held securely in the extended position by a pin 35 selectively manually inserted through aligned apertures 37 and 39 in the leg 32 and leg-receiving tube 33, respectively. See FIG. 11. FIG. 2 also shows the extended shell 22 with canopy 34 fully expanded from its stored position within the shell and circumferentially supported by three canopy rib supports 40 (shown best in FIG. 5) disposed within sleeves 99. Two as well as four or more ribs may be used, as desired. Each rib 41 is illustrated as being generally of an inverted U-shaped rod-like configuration. Presently, it is preferred that each rib 40 be formed of synthetic resinous material, such as glass reinforced nylon. Each rib may be conventionally attached to the flexible material comprising the canopy 34 or may be disposed in loops, pockets or sleeves 99 comprising said flexible material, as is well known in the art. Preferably, the flexible material used to form canopy 34 comprises a lightweight backpack material comprising synthetic resinous material such as nylon.

Shell 22 may comprise two removable or openable interior side panels 50 and 52. See FIGS. 2, 3, 4 and 6. Each panel 50 and 52 may contain a stereo speaker 56, conventionally connected to a vehicle stereo system. An upper interior panel 46 may house a standard light fixture 48, conventionally connected to the electrical system of the vehicle. A panel 45 is interposed between the lower ends of panels 50 and 52. Preferably, as with the shell 22, panels 45, 46, 50 and 52 are formed of shape-retaining, rigid, synthetic resinous material, such as glass reinforced nylon. Panels 45, 46, 50 and 52 may be padded and upholstered, if desired.

Each of the interior panels 46, 50 and 52 is connected to the exterior portion of the shell 22 by a hinge 58, 59 and 57, respectively, preferably a continuous hinge although several smaller hinges could be used without changing the nature of the invention. The hinges are preferably bonded or adhesively secured to the shell and panels. Plastic hinges, aka living hinges can be used.

Figure 9:
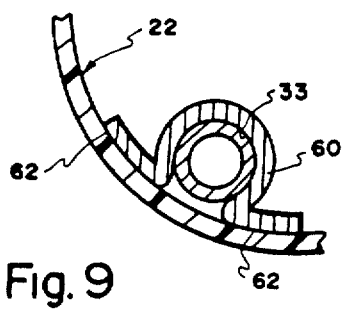
FIG. 9 is a fragmentary enlarged cross section taken along lines 9—9 of FIG. 1 of the interior of the shell or frame with a circular leg-receiving tube strapped to the shell or frame.
Figure 11:
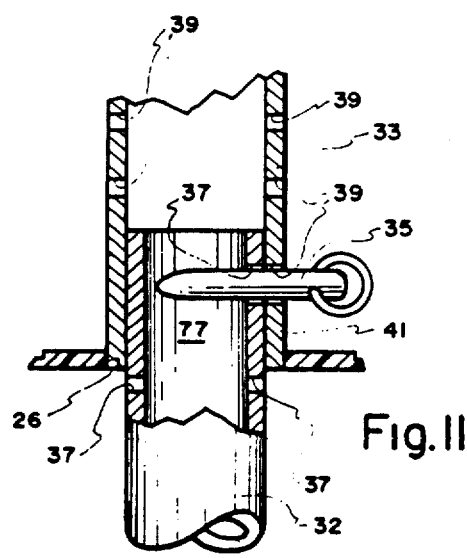
FIG. 11 is a fragmentary enlarged cross section with parts broken away for clarity, of the lower part of one leg-receiving tube with a tubular leg pin-secured thereto in an extended position.

Each leg receiving tube 33 is illustrated in FIG. 11 as comprising a lower end 41 secured to the shell 22 at aperture 26. Each tube 33 may be secured to the shell 22 by two or more straps 60, which is illustrated in FIG. 9 as being looped around the tube 33 and bonded or adhesively secured to the shell at sites 62. Alternatively, as illustrated in FIG. 9a leg-receiving tube 33 may comprise an end flange 130, top and bottom, which is bolted at 134 or otherwise rigidly secured to the tube 33 so that each top and bottom flange 130 is contiguous with the inside surface of shell 22. Each flange 130 is secured to the shell 22 by a nut and bolt assembly 134 extending through aligned apertures 136 and 138. The top of each such tube 33 is closed by the shell 22. The bottom of each tube 33 is aligned with aperture 26. See FIG. 11.

Each tube 33 comprises an inside diameter sized to telescopically receive the associated leg 32. A plurality of aligned apertures 39 are disposed in the wall of each hollow tube 33 so that the leg may be extended the distance required to engage the ground or pavement in load-transferring relation. Since the ground may be irregular, said distance is a variable, requiring different extension distances by the leg from time to time depending on the terrain. The associated pin 35 is placed appropriately between a pair of aligned apertures 39 and 37 in tube 33 and the associated leg 32.

As an alternative, square telescopically interrelated leg-receiving tubes 33' and legs 32' may be used in conjunction with pin 35. See FIG. 12a.

Figure 12:
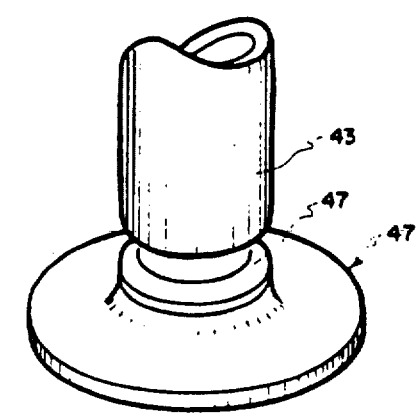
FIG. 12 is a fragmentary enlarged perspective of a pedestal usable at the distal end of each tubular leg.
Figure 6:
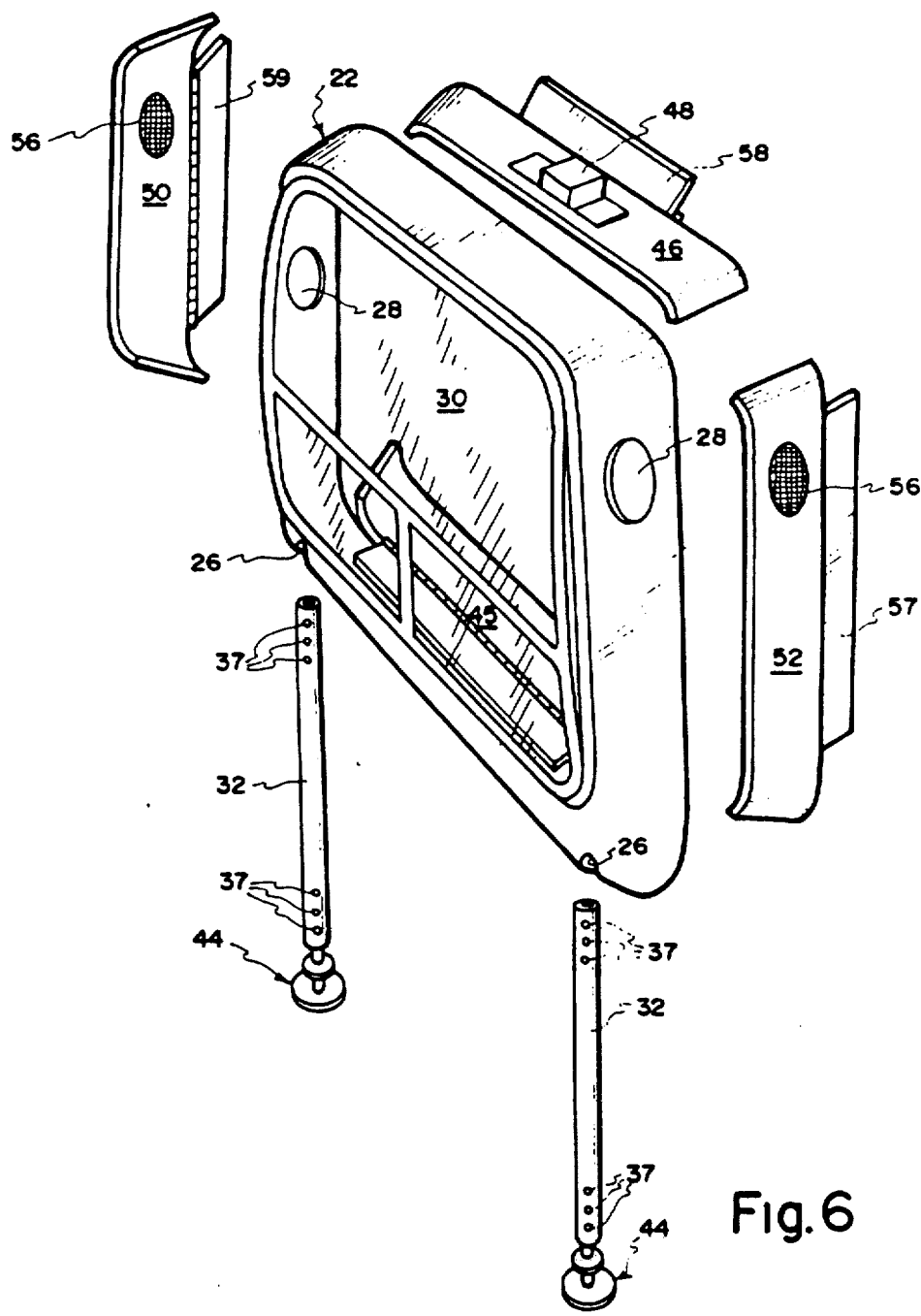
FIG. 6 is an exploded perspective view of the shell or frame of the compartment of FIG. 1.

Each leg 32 provides suitable support at the lower distal end 43. As illustrated in FIG. 12, the lower distal end 43 of each leg 32 may be equipped with a pavement or ground-engaging pedestal assembly 44, which can be pivoted at swivel 47 in respect to leg 32 to appropriately engage the surrounding ground.

Figure 13:
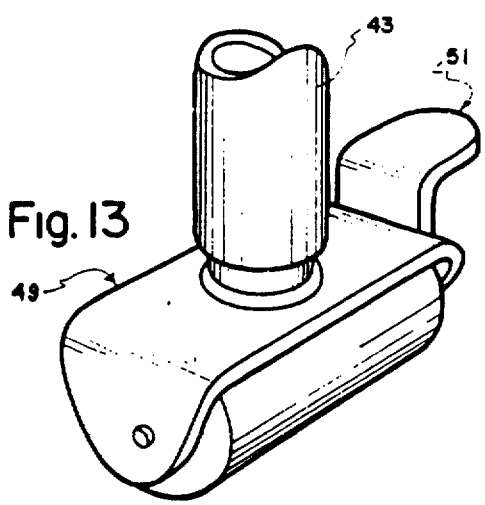
FIG. 13 is a fragmentary enlarged perspective of a preferred distal end caster of one tubular leg.

Alternatively, the distal end 43 of each leg 32 may be equipped with a conventional caster assembly 49, comprising a conventional brake 51, as shown in FIG. 13.

The distal end 43 of each leg 32 may be equipped with other pavement and/or ground-engaging structure adequate to provide load transmission to the ground from the sleeping compartment 20, when in the extended position of FIG. 2.

As a further alternative a bearing or skid plate 140 may be rigidly welded at 142 or otherwise suitably secured to the lower end of leg 32 or leg 32'. Skid plate 140 is illustrated as comprising an upwardly curved toe 144 at the back to facilitate displacement into soft dirt or the like until the static, vertical leg position is attained.

Figure 3:
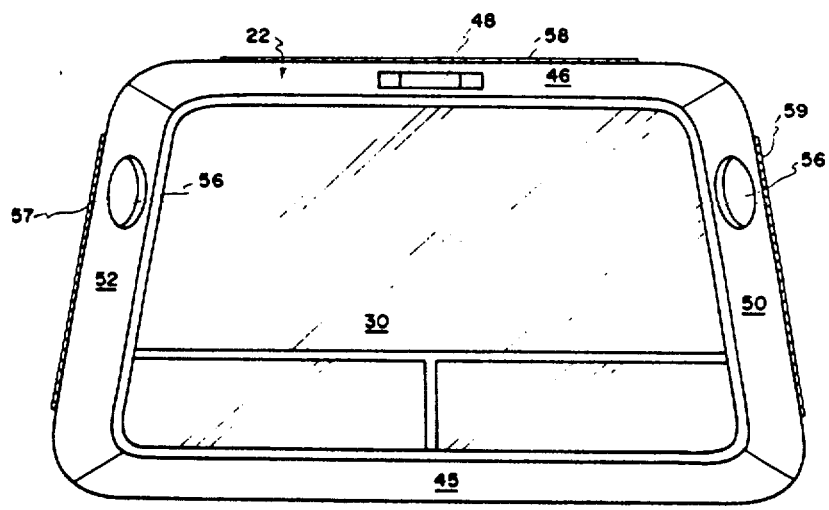
FIG. 3 is a perspective view of the sleeping compartment of FIG. 1, in the collapsed as stored position, as seen from the interior of the vehicle.
Figure 10:
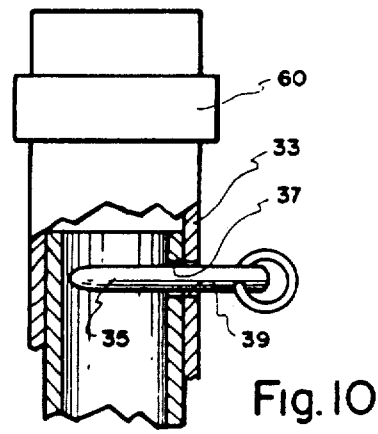
FIG. 10 is a fragmentary elevation view, with parts broken away for clarity, of the upper part of one leg-receiving tube with a tubular leg pin-secured therein in a retracted position.

With reference to FIGS. 10 and 11, when it is desired to return the sleeping compartment 20 from the position of FIG. 2 to that of FIG. 3, each pin 35 is manually removed from the position of FIG. 11, previously holding the legs 32 in their extended to ground-engaging position, and each tube 32 is displaced telescopically into the leg-receiving tube 33 with which it is associated. Ultimately, each leg 32 becomes positioned as fragmentarily shown in FIG. 10, fully inserted into the leg receiving tube 33 with which it is associated. At this point in time, the top aperture 37 in the leg 32 is placed in alignment with the top aperture 39 in the tube 33 and pin 35 is inserted therethrough. The same technique is used in respect to legs 32'.

Figure 5:
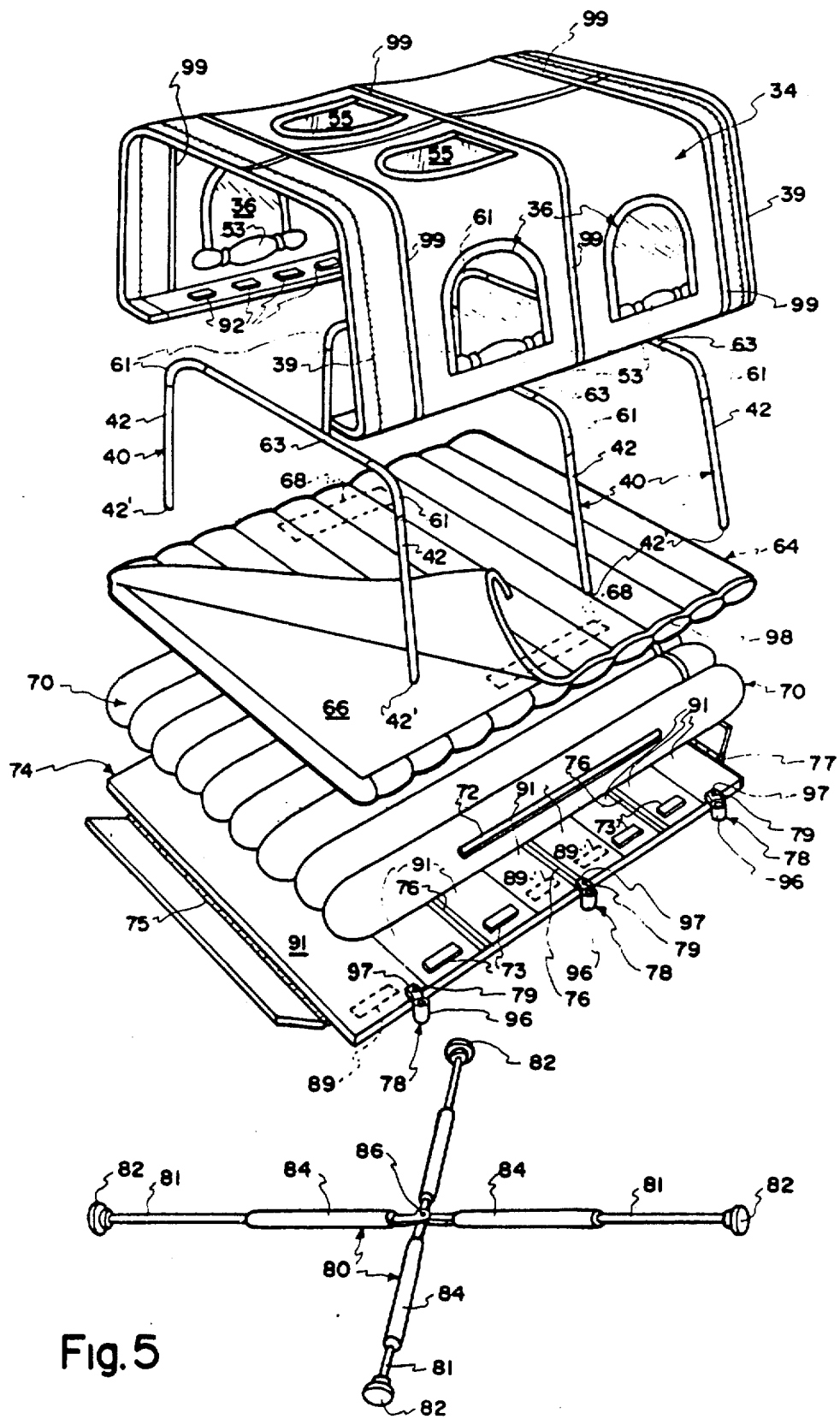
FIG. 5 is an exploded perspective view of the expanded sleeping compartment of FIG. 1, showing preferred component parts thereof.

In one embodiment, shell 22 is pivotally connected in a well known manner at its lower left and lower right corners to the distal ends of a centrally pinned telescoping support cross-member assembly 80 by two standard pivoting bolt assemblies 82, schematically illustrated in FIG. 5. Cross-member assembly 80 is then pivotally connected at the proximal ends thereof to the side of the van 21 in a well known manner. The cross member assembly 80 is located beneath both the canopy 34 and the floor of the canopy and comprises extensible/collapsible telescopically interrelated tubes 81 and 84. At the center, the four cross-members are pivotally joined together at pivot pin 86, which accommodates relative rotation of the cross-members as the shell 22 is extended and retracted.

Figure 7:
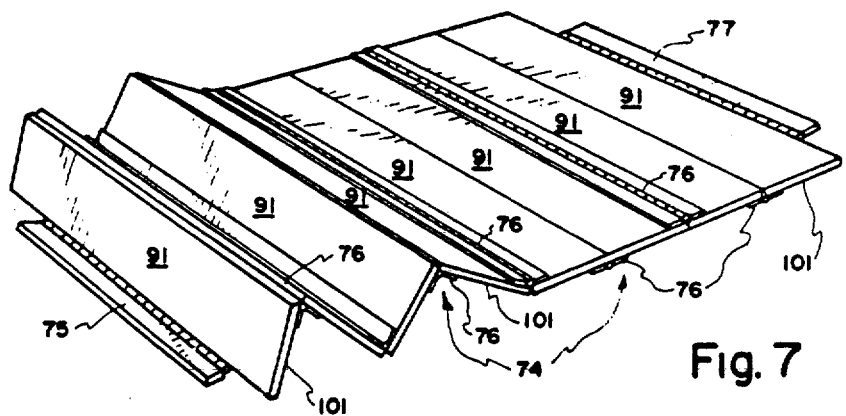
FIG. 7 (is a perspective view of a fan fold platform which may comprise part of the compartment of FIG. 1.

In the embodiment of FIGS. 5 and 7, a fan folding platform 74 forms the bottom or floor of the wall segment/sleeping compartment 20. Platform 74 comprises a plurality of rectangular panels, each designated 91, formed of any suitable material such as glass reinforced synthetic resinous material, plywood or the like, and connected one to another by continuous hinges 76 attached on alternating sides so that platform 74 will fan fold, as illustrated in FIG. 7. Each panel 91 comprises a bottom flat surface 101. Platform 74 pivotally connects to shell 22 by continuous hinge 75 (FIGS. 5 and 7). Hinge 75 is conventionally bonded, adhered, riveted or the like to the distal end of the platform 74 and to the shell 22 in a manner well known in the art. Platform 74 pivotally connects to the vehicle 21 by continuous hinge 77 (FIG. 5), which is conventionally bonded, adhered, riveted or the like to platform 74 and to vehicle 21 in a manner well known in the art.

Attached at appropriate intervals to platform 74 are three canopy rib receivers 78. See FIGS. 5 and 19. Each receiver 78 preferably comprises nylon webbing straps each doubled back on itself and sewn along the edges to form a pocket 96, into which a rib end 42' is inserted. The opposite end 97 is then attached to the platform 74, as by a single rivet 79 or the like.

An inflatable air mattress 70 (FIG. 5) rests upon and covers the top of platform 74. When stored, mattress 70 is deflated and folded into shell 22. For use, the mattress is suitably inflated, e.g. by use of a well known and commercially available cigarette lighter actuated air pump. Air mattress 70 comprises loop VELCRO fastener strips 72 attached at the perimeter on both the top and bottom (shown only on the top at one side in FIG. 5) that correspond to and engagingly receive hook fastener VELCRO strips 73, which are attached along both edges at the top of platform 74 adjacent the two sides thereof and the bottom of a sleeping bag 64 also adjacent each side thereof. Representative strips 73 are shown along one such edge in FIG. 5. Sleeping bag 64 may comprise two standard down comforters joined along three edges by a continuous zipper 98. Sheet liner 66 may be inserted into sleeping bag 64 and is held in place by VELCRO straps 68.

The interior components of wall segment/sleeping compartment 20 are thus temporarily fastened together to insure proper disposition thereof during opening and closing. The three U-shaped canopy pole supports or ribs 40 are each illustrated as comprising two generally vertical canopy poles 42 connected to one horizontal canopy pole 63 by elbow connectors 61. Canopy poles 42 and 63 are preferably of glass reinforced synthetic resinous material, but may be of some other suitable material such as aluminum tubing. The three canopy pole units 40 are illustrated as being inserted into sleeves 99 sewn into flexible canopy 34, as is well known in the art. The exposed ends 42' of the canopy pole units 40 are inserted into canopy pole receiving pockets 78, formed of flexible material to accommodate fan-fold collapse.

Figure 4:
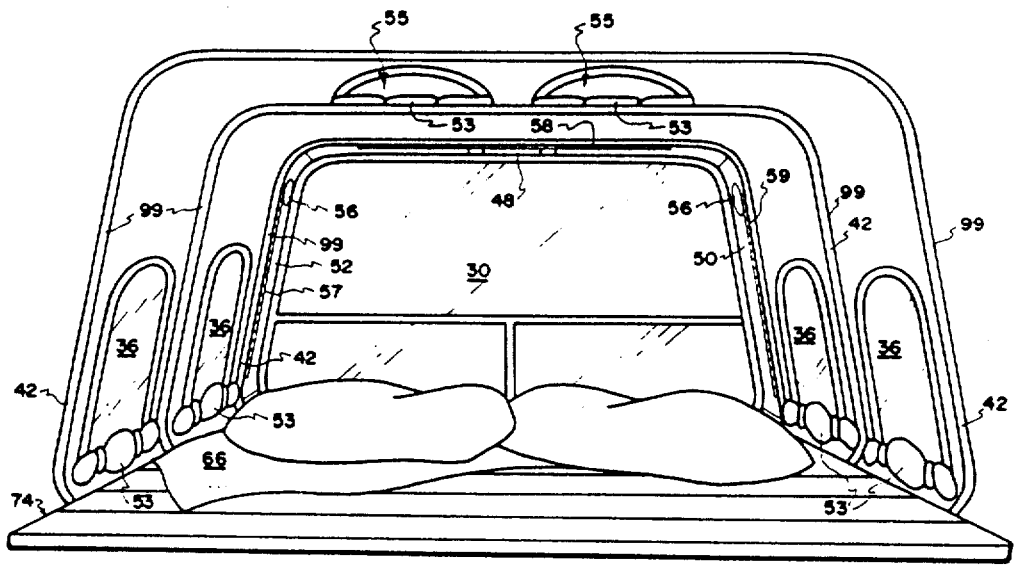
FIG. 4 is a perspective view of the sleeping compartment of FIG. 1, in the expanded position, as seen from the interior of the vehicle.

The main portion of canopy 34 can be completely removed by actuation of fore and aft zippers 38. Canopy 34 attaches to support platform 74 by VELCRO strips. VELCRO components 92 are attached to the inside at side edges of canopy 34 and mating VELCRO components 89 are attached to the bottom 101 of platform 74. Canopy 34 comprises four side windows 36 at present preference constructed of a nylon mesh, transparent vinyl or the like, each equipped with an interior roll down zippered flap 53. Two clear vinyl sky lights 55 are illustrated as being disposed in the upper portion of canopy 34, each having zippered flaps 53 which, when open, are held open by VELCRO strips 63. While FIGS. 2, 4 and 5 illustrate windows 36 and skylights 55 as being arch-shaped, other window and/or skylight configurations may be used. For example the rectangularly-shaped vinyl window/skylight 87 of FIG. 5a may be used. In this configuration, each window/skylight 87 is stitched to the canopy 34 around the perimeter 93 of the window/skylight 87.

Figure 8:
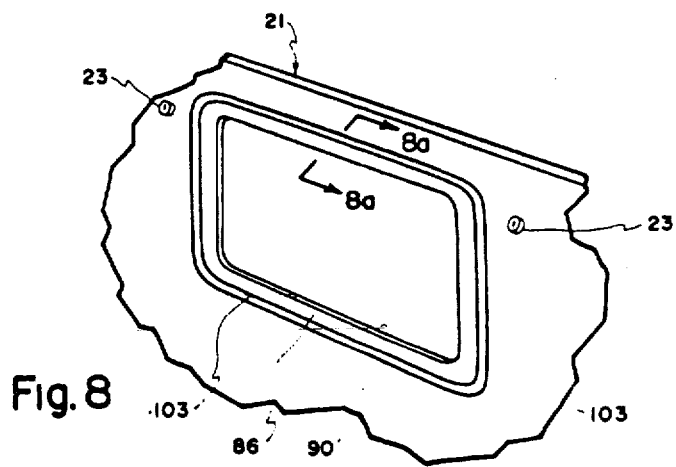
FIG. 8 is an exterior perspective view of the window region of the van of FIG. 1, with the sleeping compartment completely removed.

As shown in FIGS. 8 and 8a, the side of vehicle 21 receives a gasket 103 and shroud 86 to finish the opening left by removal of the original window assembly 30. In the closed position, as shown in FIG. 1, shell 22 is attached directly to the side of vehicle 21. A compressible seal 104, carried by and adhesively secured to the shell 22 at the interior adjacent the periphery, sealingly engages gasket 103 when the shell is closed. See FIG. 8a. In this position, substantially all components, other than the shell, are concealed and stored within the shell 22. Shell 22 is releasibly locked to the side wall of vehicle 21 by the conventional and well known key-activated solenoids 10. See FIG. 1a. When the vehicle 21 is traveling, the wall segment/sleeping compartment 20 remains in this closed, locked position. To displace the shell 22 to its open position, the lock at each site 23 is key released to de-activate each shell anchored solenoid 10, which retracts rod 11 from latch bracket 13 at aperture 12 thereby unlocking the shell 22. The anchor by which the solenoid exterior casing is secured to the vehicle 20 is shown schematically at site 10' in FIG. 1a. Bracket 13 is secured to the shell 22 by rivets 15 passing through aligned apertures 16 and 17 in bracket flange 14 and shell 22. Handles 24 are manually pulled. The shell 22 is thus displaced from a position contiguous with the side of the vehicle 21. Once the shell 22 has been pulled slightly away from the van, the legs 32, 32' are released and drop to their extended position. Thereafter, by continuing to pull the shell at handles 24 horizontally away from the vehicle 21, the user can easily fully extend the sleeping compartment 20. During extension telescoping cross-member assembly 80 (FIG. 5) is simultaneously opened to provide support for the compartment 20.

Platform 74, which was previously fan folded into the shell 22 is also extending to a flattened condition. When platform 74 is completely extended and flat, no further extension is possible or required. With the vertically extended support legs 32 disposed in load transferring relation, the compartment does not materially deflect or oscillate during use.

While telescoping cross-member assembly 80 and platform 74 are being extended, canopy 34 is also expanded from its collapsed, folded, stored position and becomes fully extended and generally taut simultaneous with platform 74 and telescoping support cross-member assembly 80. Air mattress 70 is deflated during storage and lays on top of platform 74 in a folded condition. The mattress is extended with platform 74. The air mattress 70 is inflated by the user after being fully extended. Sleeping bag 64, which is attached to air mattress 70 by VELCRO Component 68 and 72, also folds with and extends with platform 74 and air mattress 70. The lower edges of the expanded canopy 34 are attached to the underside of the platform 74 by VELCRO Component strips 89 and 92 (or as otherwise explained herein).

To store the sleeping compartment 20, the user detaches the Velcro components 92 from VELCRO components 89. Air mattress 70 is deflated, after which the shell 22 is manually displaced horizontally towards the vehicle 21. As the shell 22 is displaced toward the vehicle 21, the canopy 34 compacts by collapsed folding and the platform 74, as well as the sleeping bag 64 and air mattress 70, fold. Telescoping cross-member assembly 80 telescopically compacts. Vertical support legs 32 are manually returned back into receiving tubes 33 and pin secured. The shell 22 is locked to the wall of the vehicle 21 by actuation at sites 23.

Reference is now made to FIGS. 14–18, which illustrate a presently preferred support mechanism, generally designated 110, which may be used in conjunction with wall segment/sleeping compartments fashioned in accordance with the present invention in lieu of the heretofore described fan fold platform 74 and cross-bar assembly 80.

Figure 14:
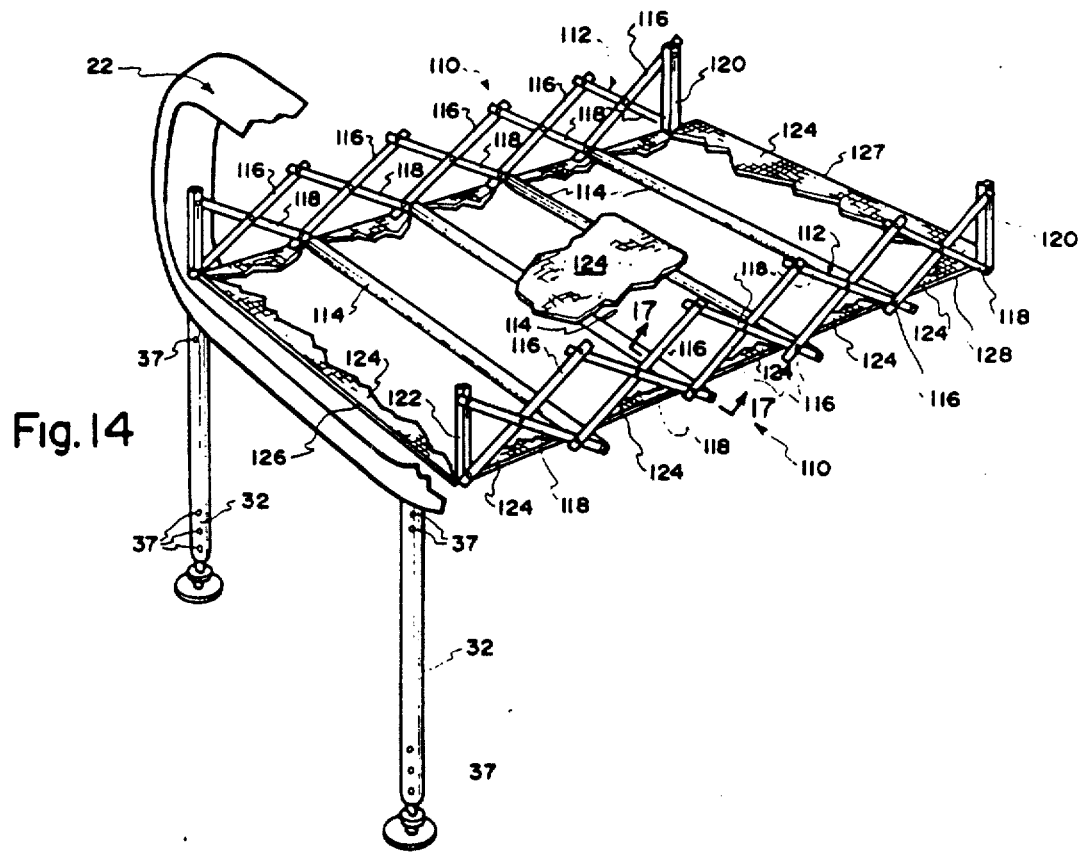
FIG. 14 is a perspective of presently preferred scissors framework for supporting sleeping compartments according to the present invention.

The scissors frame assembly 110 comprises side scissors frames 112, joined one to another by spaced floor cross-members 114. Each structural member of the frames 112 and members 114 is preferably a standard structural shape, such as a box beam formed preferably of tubular steel. Each side frame 112 comprises an X-shaped assembly comprising diagonally disposed crossing bars 116 and 118. Proximal members 116 and 118, at their respective proximal ends thereof, are hingedly connected to a vertically directed channel-shaped proximal anchor bar 120. The distal members 116 and 118, at their respective distal ends thereof, are pivotally joined to a vertically directed distal anchor bar 122. The top pivotal connection at anchor bars 120 and 122 passes through aligned slots 121 in the flanges thereof. See FIG. 18. This accommodates extension and collapse of the scissors frameworks 112. Each of the diagonally disposed members 116 is connected to contiguous diagonally directed associated members 118 by a pin or other pivotal connecting structure at each of the connection sites illustrated in FIG. 14. Accordingly, the scissors side frames, both left and right, 112 may be collectively extended from or collapsed into the shell 22 by reason of pivotal displacement between said members. The extended position is illustrated in FIG. 14.

Each channel-shaped vertical proximal bar 120 is rigidly anchored by a suitable well-known fastener, adhesive, bonding or in any other satisfactory way to the vehicle per se at the opening 90 thereof. See FIG. 8. The two distal vertical bars 122 are similarly rigidly connected to the interior of the shell 22 by a satisfactory conventional fastening technique.

Each low point of each scissors side frame 112 is connected to one of the cross-bar members 114. The cross-bar members 114 thus collectively provide support for the above-described air mattress, sleeping bag and the like. A rectangular sheet of lightweight fabric 124 (preferably DuPont DYMETROL) extends across the top of the cross-bars 114, being secured at the distal end 126 thereof to the interior of the shell 22 and top of the vehicle at the proximal end 127 by bonding, adhesive or the like. It is presently preferred that compartment floor fabric 124 be secured to cross-members 114 by rivet 172, as shown in FIG. 17.

Figure 18:
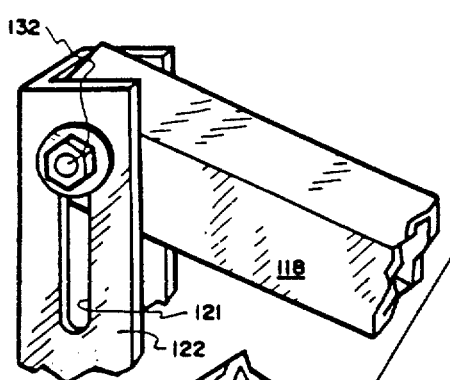
FIG. 18 is an enlarged side elevation of a suitable and presently preferred end members for the scissors framework of FIG. 14.

Reference is made to FIG. 18 which illustrates the presently preferred mode of connecting the upright channel-shaped anchor members 120 and 122 to each of the diagonal members 116 and 118 to which connection is made. In reference to FIG. 18, the top end of each member 120 and 122 is slotted at sites 121 in opposed flanges, the lower end of each member 120 and 122 is apertured and the one end of diagonal members 118 and 116 are provided with appropriately sized and located apertures. The ends of members 116 and 118 to be connected to vertical members 120 and 122 are placed between the flange of members 120 and 122 so that apertures and slots align. Bolt assemblies 132 and 134 are placed through the aligned sets of slots and/or apertures and tightened in such a way that members 116 and 118 may pivot in respect to members 120 and 122 and bolt assemblies may move up and down in slots 121, while preserving the frame assembly 110 in tact.

Figure 15:
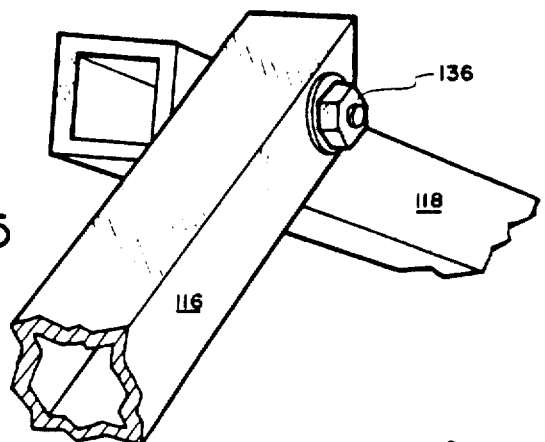
FIG. 15 is an enlarged fragmentary perspective of some of the pivotal connectors of the scissors frame of FIG. 14.
Figure 16:
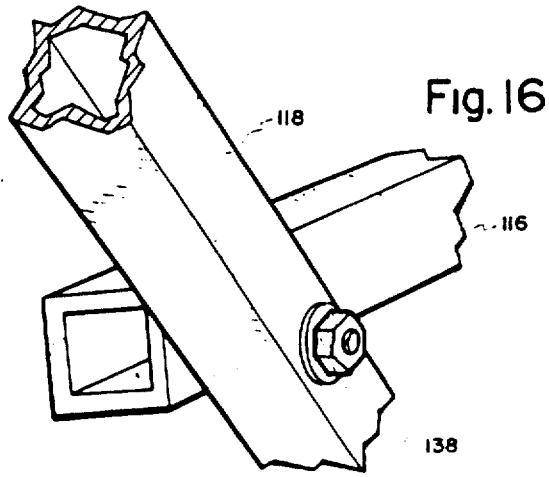
FIG. 16 is an enlarged fragmentary perspective of other of the pivotal connectors of the scissors frame of FIG. 14.

Each central and top connector between diagonal bar members 116 and 118 is preferably fabricated essentially as illustrated in FIG. 15 whereby the members 116 and 118 cross and aligned apertures are disposed in the two crossing members 116 and 118 at their intersection point. A bolt assembly 136 is inserted through the apertures and tightened to retain the assembled condition while accommodating relative pivotal motion. The lower connection sites between crossing diagonal members 116 and 118 are preferably joined as described in conjunction with FIG. 15. See FIG. 16. More specifically, the overlapping members 116 and 118 are apertured in alignment one with another central at the point of intersection. A bolt assembly 138 placed therebetween and tightened is sufficient to accommodate said pivoting action.

Figure 17:
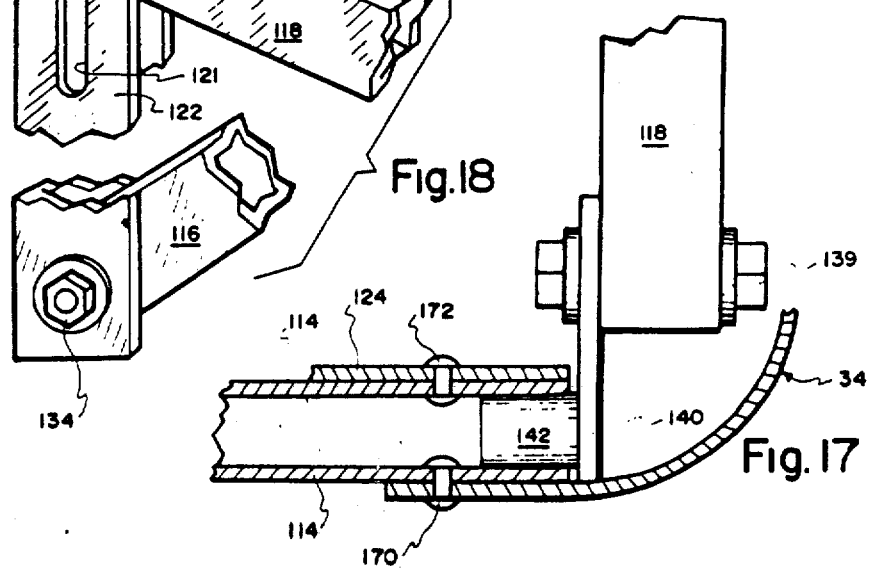
FIG. 17 is an enlarged cross section taken along lines 17—17 of FIG. 14 of the preferred connection structure bridging the two side scissors frames and further illustrating rivet connections between the canopy cover and a canopy cloth floor.

FIG. 17 illustrates the presently preferred mode by which each cross-member 114 is secured at each end to the lower end of diagonal bars 118. Specifically, a suspension plate 140 is apertured at the upper end thereof. The lower end of the associated diagonal member is similarly apertured. The apertures are aligned and the bolt of the bolt assembly 139 is caused to pass through the aligned apertures and tightened whereby the plate 114 is secured to the lower end of the associated member 118 in depending relation as illustrated in FIG. 17. The plate 140 near the lower end thereof is connected to a male stud 142 which projects inwardly into the hollow interior of the associated cross-bar 114. Thus, the cross-bars 114 are held in the positions of FIG. 14.

Metal collars 117 (FIGS. 14a) may be secured in appropriate vertically alignment by nut and bolt assemblies 136 and 138 for receipt of canopy ribs.

The spaced cross-bars 114 provide support for the sheet material 124, as described above. The assembly of FIG. 17 may be used wherein the lower edges of the canopy 34 are riveted at sites 170 to each cross-member 114, the flexible floor 124 may likewise be riveted at sites 172 to each cross-member 114.

In some configurations of the inventions the top portion of the canopy is internally supported by a beam. One presently preferred beam, generally designated 130', is shown in FIG. 20. Beam 130 is illustrated as comprising three bars 132', 134' and 136'. Bars 132' and 134' are illustrated as being hinge connected by hinge 138' interposed between bars 132' and 134' along the right side thereof selectively accommodating clockwise rotation of bar 134' in respect to bar 132'. Similarly, hinge 140' is located along the left side being interposed between bars 134' and 136' to accommodate counterclock rotation of bar 136' in respect to bar 134'.

Bar 132' carries a linearizing clip 142' at pivot pin 144'. The clip is symmetrical on each side of the axis of the beam 130' so that when in the solid line position as illustrated in FIG. 20, pivoting of bar 134' relative to bar 132' is prevented. In like fashion bar 134' carries clip 146' at pin 148'. Likewise, in the position illustrated in FIG. 20, clip 146' prevents relative rotation of bar 136' in respect to bar 134'.

Restated, when the bars 132', 134' and 136' are positioned in linear relation and clips 142' and 146' are in their solid line positions illustrated in FIG. 20, beam 130' is rigid and when disposed centrally immediately below the top of the canopy, will provide cantilevered beam support for the canopy. Machine screw 150, pivotally passing through aperture 152 in the proximal end of the bar 132' threads into a suitable anchor site at the vehicle adjacent the opening, while the upper threaded end of the machine screw 154, which rotatably passes through aperture 156 in the distal end of the bar 136', is appropriately anchored to the shell 22.

When it is desired to collapse the canopy and to place the shell 22 in its closed position, the user rotates the clips 142' and 146' about the pins 144' and 148', respectively, until each clip clears bars 134' and 136', respectively. The shell, canopy and other parts of the sleeping compartment are progressively collapsed which causes the bars 132', 134' and 136' to fan-fold together, within the shell 22, when the collapsing or folding operation is finished.

Alternatively, top beam 130" may be used. See FIG. 21. Beam 130" preferably comprises three bars, only two of which, i.e. 132" and 134" are illustrated. Bars 132" and 134" are hinge connected by hinge 138" interposed between bars 132" and 134" along the right side thereof selectively accommodating clockwise rotation of bar 134" in respect to bar 132". Similarly, another hinge is located along the left side being interposed between bar 134" and another bar to accommodate relative clockwise rotation of bar 134" in respect to the other bar. The hinged end of bar 132" is notched opposite the hinge, at 182, in which a solid insert 184 is placed and secured. The associated end 186 of bar 134" is notched at 188 to match notch 182, is L-shaped and hollow at 190 to accommodate insert 184.

Bar 132" carries a linearly displaceable sleeve 180. When the bars 132" and 134" are pivoted about hinge 138" into linear alignment the sleeve 180 is shifted from the solid line to the dotted line position as illustrated in FIG. 21. Thus, pivoting of bar 134" relative to bar 132" is prevented. Bar 134" is likewise locked to the third bar. The remainder of beam 130" may be formed as described for beam 130'.

Restated, when the three bars comprising 132" and 134" are positioned in the described linear, locked relation, beam 130" is rigid and when disposed centrally immediately below the top of the canopy, will provide cantilevered beam support for the canopy.

When it is desired to collapse the canopy and to place the shell 22 in its closed position, the user slides sleeves 180 until each sleeve clears the hinge sites to the solid line position of FIG. 21. The shell, canopy and other parts of the sleeping compartment are progressively collapsed which causes the three bars of beam 130" comprising bars 132" and 134" to fan-fold together, within the shell 22, when the collapsing or folding operation is finished.

The invention may be embodied in other specific forms without departing from the spirit or essential characteristics thereof. The present embodiments, are, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. In combination:
   a vehicle comprising a side opening; and
   a closure segment/sleeping compartment comprising:
   housing means which in a closed position comprises means circumscribing the vehicle opening, means spanning across the vehicle side opening and means releasibly securing the housing means in the closed position against inadvertent relocation, the housing means further comprising means releasing the housing means from the closed position and means accommodating substantially rectilinear generally horizontal displacement of the released housing means from said closed position to an open position above a ground location;
   vertical support means selectively interposable between the housing means when in the open position and the ground location; and
   canopy means comprises substantially rectilinearly displaceable sheet means interposed between the vehicle adjacent to the opening and the housing means to define a tent-like structure in the open position and which collapses in a folded pattern between the vehicle and the housing means in the closed position, the canopy means further comprising substantially rectilinearly foldable base means upon which sleep-accommodating means is supported in generally horizontal relation.

2. A combination according to claim 1 wherein the circumscribing means comprises a shell-like generally rectangular frame.

3. A combination according to claim 1 wherein the circumscribing means comprises a peripheral frame and means by which a seal is formed between the housing means and the vehicle.

4. A combination according to claim 1 wherein the spanning means comprises window means.

5. A combination according to claim 1 wherein the releasibly securing means comprises at least one lock releasibly spanning between the vehicle and the housing means.

6. A combination according to claim 5 wherein the releasible securing means further comprises key-responsive means by which the lock is released.

7. A combination according to claim 1 wherein the displacement accommodating means comprises at least one handle.

8. A combination according to claim 7 wherein the handle is without moving parts.

9. A combination according to claim 1 wherein the vertical support means comprises at least two spaced legs telescopically selectively insertable into and removable from hollow leg-receiving means carried by the housing means.

10. A combination according to claim 9 wherein each leg comprises ground engaging means.

11. A combination according to claim 10 wherein each ground engaging means comprises pedestal means.

12. A combination according to claim 10 wherein each ground engaging means comprises caster means.

13. A combination according to claim 9 wherein each leg-receiving means comprises hollow tubular means.

14. A combination according to claim 9 wherein each log and each hollow leg-receiving means are apertured to selectively receive pin means to hold the telescopically interrelated legs and leg-receiving means in any one of a plurality of relative positions.

15. A combination according to claim 1 wherein the sheet means comprises lightweight fabric which folds upon itself and unfolds when displaced between the closed and open positions.

16. A combination according to claim 1 wherein the sheet means comprises hood means and the canopy means further comprises hood support means.

17. A combination according to claim 16 wherein the hood support means comprises spaced arch-like supports.

18. A combination according to claim 17 wherein the spaced arch-like supports are disposed in sleeve means.

19. A combination according to claim 1 wherein the base means comprises fan fold platform means.

20. A combination according to claim 1 wherein the canopy means comprises scissor side frame means which can be selectively extending and collapsed with the sheet means.

21. A combination according to claim 20 wherein the base means comprises spaced beam means and connects to the scissor side frame means.

22. A combination according to claim 21 wherein the base means further comprises flexible material spanning tautly across the spaced beam means in the extended position.

23. A combination according to claim 1 wherein the sleep-accommodating means comprises inflatable/deflatable mattress means.

24. A combination according to claim 1 wherein the sheet means of the canopy means comprises at least one window means.

25. A combination according to claim 24 wherein the window means comprises means by which the window means is closed.

26. A combination according to claim 25 wherein the close means comprises a zipper.

27. A combination according to claim 24 wherein the window means comprises impervious transparent means.

28. A combination according to claim 24 wherein the sheet means comprises flap means adjacent the window means which flap means comprises releasible fastening means, actuation of which will cause the flap means to either close or open the window means to visual observation therethrough.

29. A combination according to claim 1 wherein the combination comprises fastener means.

30. A combination according to claim 1 wherein the housing means further comprises interior storage means accommodating collapsing of at least some portions of the closure segment/sleeping compartment when the compartment is displaced from the open to the closed positions.

31. A combination according to claim 30 wherein the interior storage means is selectively concealed by interior storage closure means.

32. Expandable/collapsible sleeping compartment pouch structure for placement adjacent to a side opening in a vehicle, the pouch structure comprising:

substantially rigid casing means being selectively connectable to and releasable from a side of the vehicle and having an exterior, an interior, and a perimeter slightly greater than the vehicle side opening, the interior of the casing means defining storage means; and canopy means connected to the interior of the casing means and comprising means substantially rectilinearly collapsible into and expandable from within the casing means at the storage means as the casing means is substantially rectilinearly displaced between a closed position adjacent to the vehicle and an expanded essentially horizontal position away from the vehicle, the substantially rectilinearly collapsible means comprising structural support means by which the expanded canopy means is retained in said expanded essentially horizontal position, the structural support means comprising substantially rectilinearly foldable means across which interior bedding means is placed.

* * * * *